United States Patent [19]

Whited

[11] Patent Number: 4,707,562

[45] Date of Patent: Nov. 17, 1987

[54] HIGH VOLTAGE PROTECTION BARRIER

[76] Inventor: Gary L. Whited, P.O. Box 99, 99 Community Rd., Kirkersville, Ohio 43033

[21] Appl. No.: 922,568

[22] Filed: Oct. 24, 1986

[51] Int. Cl.$^4$ .............................................. H02G 1/02
[52] U.S. Cl. .................................... 174/5 R; 24/512; 24/517; 174/40 R
[58] Field of Search ...................... 174/5 R, 40 R, 139, 174/146; 109/49.5; 24/132 R, 132 AA, 489, 493, 498, 512, 517

[56] References Cited

U.S. PATENT DOCUMENTS

| | | | |
|---|---|---|---|
| 2,566,841 | 9/1951 | LaDuca | 24/493 |
| 2,770,667 | 11/1956 | Runde | 174/5 R |
| 2,891,751 | 6/1959 | Raypholtz | 174/146 X |
| 3,586,292 | 6/1971 | Buck | 174/146 X |
| 3,835,238 | 9/1974 | West | 174/5 R |

FOREIGN PATENT DOCUMENTS 6633 of 1911 United Kingdom .................. 24/512

OTHER PUBLICATIONS

McGraw, Michael G., "Joint Effort Yields New Barrier Design" *Electrical World*, vol. 199, No. 1, Jan. 1985, pp. 85 and 86.

Primary Examiner—Laramie E. Askin
Attorney, Agent, or Firm—Michael Sand Co.

[57] ABSTRACT

A protection barrier is adapted to be placed on an insulator of a high voltage power pole to prevent a workman from contacting components of the pole when working on an energized conductor. A base plate of dielectric material is formed with a V-shaped slot and is placed on the insulator with the apex of the slot being located between adjacent skirts of a post type insulator. A pair of dielectric locking plates are pivotally mounted on the base plate and when in an open position permit the insulator to enter into the V-shaped slot and when in closed position lock the base plate on the insulator. The locking plates have aligned curved notches which form a generally circular-shaped opening when in closed position and which align with the apex of the V-shaped slot. Curved surfaces of the notches engage the insulator when the base plate is placed thereon to positively move the locking plates into clamping position about the insulator. Each of the clamping plates has an offset panel which forms an envelope opening for receiving a portion of the base plate therein to maintain the locking plates in juxtaposition to the base plate.

20 Claims, 8 Drawing Figures

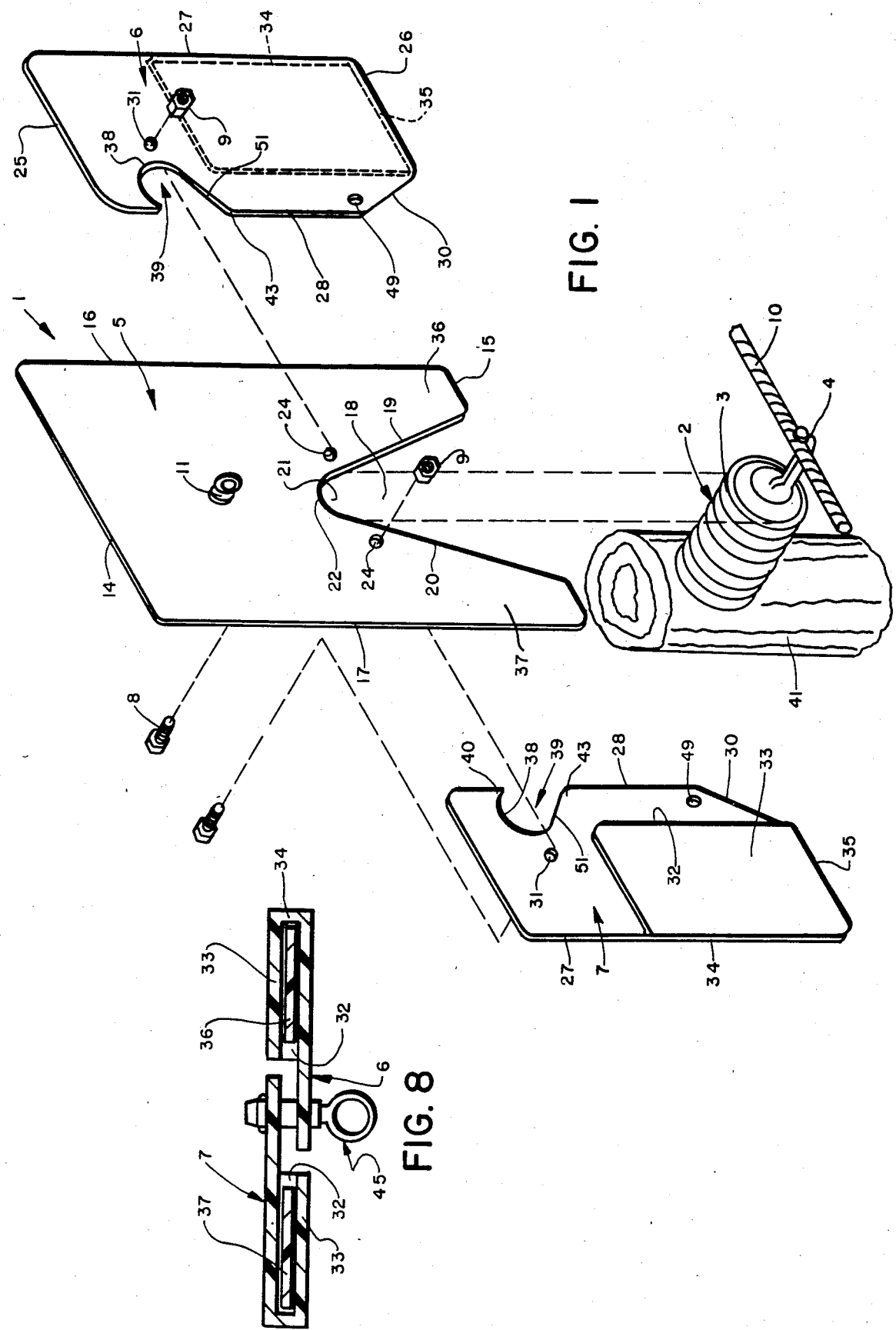

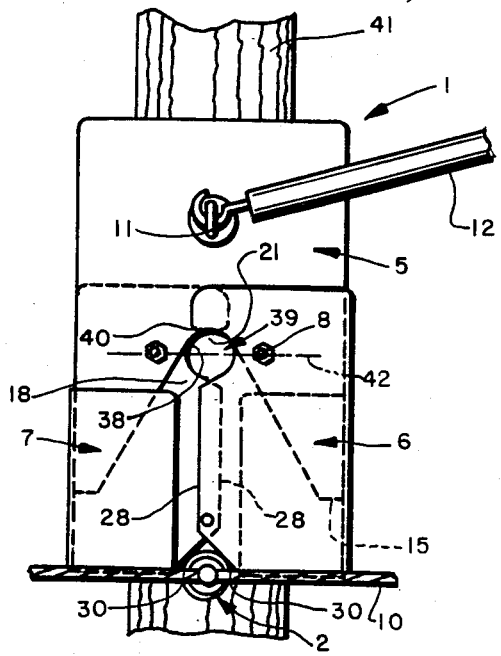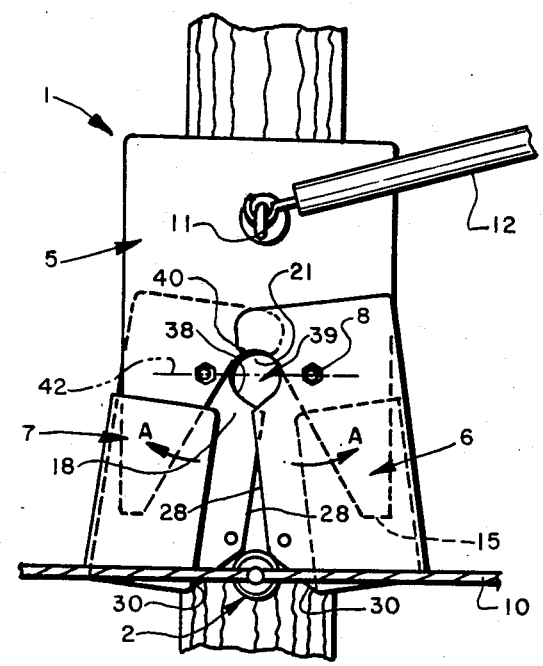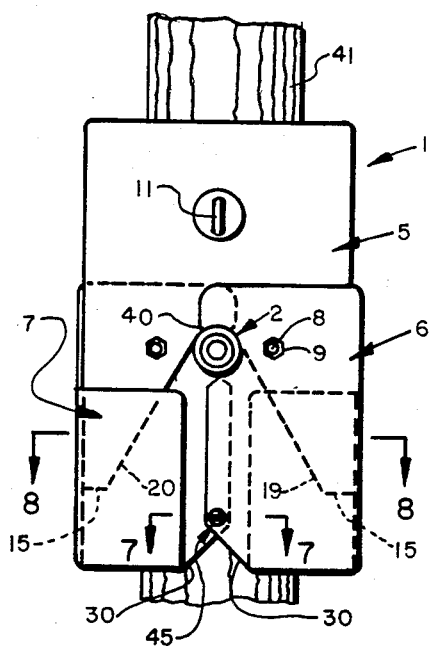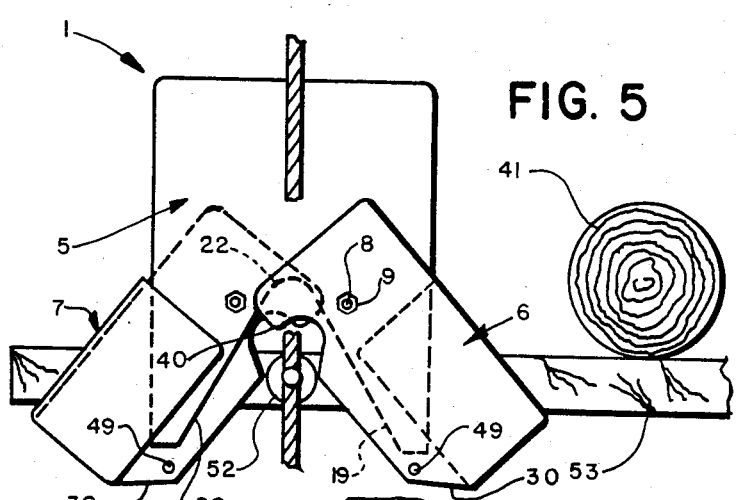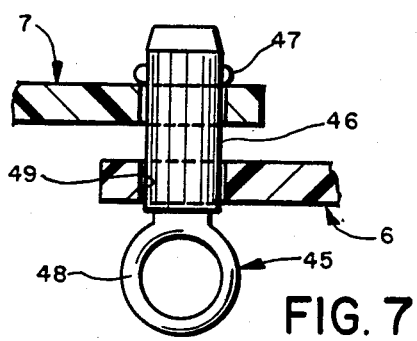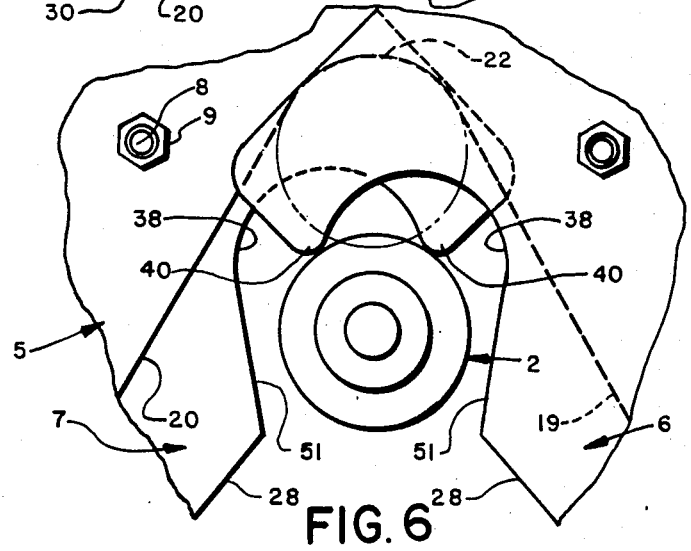

HIGH VOLTAGE PROTECTION BARRIER

TECHNICAL FIELD

The invention relates to electrical power lines and in particular to an insulative device to protect a workman. More particularly, the invention relates to a device formed of a dielectric material which is placed on a post type insulator for preventing personnel working on an energized electrical conductor from coming into contact with the pole, crossarm or other component thereof.

BACKGROUND ART

It is desirable in performing work on high voltage power lines to be able to work the lines "bare handed" while energized, that is, instead of using insulative poles and other protective equipment. This is considerably more desirable than having to deenergize the line and perform the work "cold." The use of aerial bucket trucks has facilitated maintenance of energized power lines and has enabled such lines to be maintained energized, up to a specific voltage level, for example 34,000 volts. However, certain safety requirements, such as maintaining a predetermined distance between a workman located in an aerial bucket truck and the power pole, crossarm or other component thereof while the conductor is energized, have prevented maintenance from being performed on energized 69,000 volt conductors without the use of insulative equipment. Three feet of clearance is required from a conductor energized at 69,000 nominal phase-to-phase volts to a pole component which is at a different potential than that of the aerial bucket. Since the post type insulators used for most 69,000 volt power lines are not three feet in length, this required distance cannot be obtained; therefore, the conductor must be deenergized before work can be performed thereon. This requires additional expense when performing the maintenance as well as inconvenience to both the electric company and ultimate users of the electricity.

Therefore, the need has existed for a device which can be used in conjunction with an energized power line or other electrical equipment which can be readily placed on and removed from the equipment to provide an insulative protection barrier for the workman, to enable him to perform work on the equipment or power line conductor, usually from an aerial truck, while the line is energized.

DISCLOSURE OF THE INVENTION

Objectives of the invention include providing an improved high voltage protection barrier which can be readily mounted on and removed from a post insulator of the type used on high voltage lines operating, for example at 69,000 volts, in a simple, safe and easy manner, preferably by the use of an insulative tool, and which will enable a workman to perform work on the energized conductor since it provides the required spacing between the workman and pole component. Another objective is to provide such an improved barrier which is formed out of a relatively lightweight dielectric material having a base plate formed with a V-shaped slot which is suspended between a pair of the insulator skirts of either a horizontal or vertical type post insulator and then is locked thereon by a pair of pivotally mounted locking plates mounted on the base plate.

A still further objective is to provide such an improved protection barrier in which the locking plates are moved from a closed to an open position automatically upon placing the barrier on the insulator by the insulator engaging camming surfaces on the locking plates followed by the subsequent positive locking or closing action of the locking plates about the insulator by the insulator engaging curved camming surfaces at an opposite end of the locking plates. Another objective is to provide such an improved barrier which may have a separate locking device for securing the locking plates in locked position about the insulator to prevent the accidental disengagement of the barrier from the insulator should the barrier rotate on the insulator due to wind or other forces acting thereon; and in which the locking plates are provided with an envelope-like opening into which the edges of the base plate are received to maintain the locking plates in juxtaposition to the base plate to facilitate the installation on an insulator.

A further objective of the invention is to provide such an improved high voltage protection barrier which is of a relatively simple, maintenance free construction, and which satisfies the needs existing in the art in a safe and efficient manner.

These objectives and advantages are obtained by the improved high voltage protection barrier of the invention which is adapted to be mounted on an insulator of an electric power line, the general nature of which may be stated as including, an elonated generally flat base plate formed of a dielectric material; slot means formed in the base plate for slidably receiving an insulator therein for suspending said base plate on the insulator; a pair of locking plates formed of a dielectric material pivotally mounted on the base plate on opposite sides of the slot means and movable between open and closed positions; and notch means formed in each of the locking plates for trapping an insulator therebetween when the locking plates are pivoted into the closed position about an insulator for locking the barrier on the insulator.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 1 is an exploded perspective view showing the main components of the high voltage protection barrier of the invention;

FIG. 2 is a front plan view showing the protection barrier in a closed position at the start of its placement on a horizontal post insulator mounted on a power pole;

FIG. 3 is a view similar to FIG. 2 showing the locking plates of the protection barrier being moved outwardly to a partial open position as the barrier is being placed on the post insulator;

FIG. 4 is another view similar to FIGS. 2 and 3 showing the protection barrier in an installed position on the post insulator;

FIG. 5 is a view showing the protection barrier being installed on a vertical post type insulator mounted on the cross arm of a power pole with the locking plates being shown in a full open position;

FIG. 6 is an enlarged fragmentary view showing the positive closing action of the curved camming surfaces of the locking plates when engaged with the insulator;

FIG. 7 is an enlarged fragmentary sectional view taken on lines 7—7, FIG. 4, showing an auxilliary locking device for maintaining the locking plates in locked position about an insulator; and FIG. 8 is an enlarged sectional view taken on line 8—8, FIG. 4.

BEST MODE FOR CARRYING OUT THE INVENTION

The high voltage protection barrier of the invention is indicated generally at 1 and is shown in exploded view in FIG. 1 spaced above a usual type of post insulator 2. Insulator 2 consists of a plurality of individual spaced skirts 3 and terminates in a clamp 4 to which a high voltage conductor 10 is attached. Barrier 1 includes as its main components a base or main plate indicated generally at 5, and a pair of similar secondary or locking plates indicated generally at 6 and 7.

Plates 6 and 7 are pivotally mounted on base plate 5 by a pivot pin, which can be a bolt 8 and associated nut 9 as shown in the drawings. Plates 5, 6, 7 and bolts 8 and 9 are formed of a dielectric material such as fiberglass, which provides insulation protection for the workman. Although barrier 1 is not an insulator per se, it does provide some electrical insulation in additional to preventing a workman from coming into contact with a component of a high voltage line, which component is at a different potential than that of the workman. An eye hook 11 preferably is attached to an upper portion of base plate 5 for use with an insulative rod 12 or similar type of equipment for placement and removal of the barrier onto and from insulator 2 as shown particularly in FIGS. 2 and 3.

Base plate 5 has a generally rectangular configuration with top and bottom edges 14 and 15 and side edges 16 and 17. A V-shaped slot 18 extends inwardly from bottom edge 15 to the middle area of the plate. Slot 18 is formed by inwardly converging edges 19 and 20 which terminate in a curved apex 21. Apex 21 has a curved top edge 22 nearly semi-circular in configuration. A pair of holes 24 are formed in plate 5 through which pivot bolts 8 project for pivotally mounting locking plates 6 and 7 thereon.

Locking plates 6 and 7 are similar in shape and size and therefore only one is described in detail. Each plate 6 and 7 has a generally rectangular configuration with spaced top and bottom edges 25 and 26, and side edges 27 and 28. Bottom edge 26 and inner side edge 28 are connected by a diagonally extending camming edge 30, the purpose of which is described in greater detail below. A hole 31 is formed in an upper portion of each plate for aligning with a hole 24 of plate 5 for receiving pivot bolt 8 therethrough.

An envelope type opening 32 (FIGS. 1 and 8) is formed on each plate 6 and 7 by an offset panel 33 for receiving the lower ends or leg-like portions 36 and 37 of base plate 5 therein. Panels 33 preferably are formed integrally with plates 6 and 7 and are connected thereto by an end wall 34 and a bottom wall 35.

Another feature of the invention is the formation of a curved upwardly extending notch indicated generally at 39, inwardly from side edge 28 of each locking plate. Notch 39 is defined by a curved generally semicircular edge 38 which terminates in a pointed projection 40, the purpose of which is described in greater detail below.

The center of aligned notches 39 and apex 21 of base plate 5 preferably are located on an imaginary line extending through the center of pivot bolts 8 indicated by dot-dash line 42 (FIGS. 2 and 3).

The mounting of projection barrier 1 on an insulator is shown in FIGS. 2–4. Insulator 2 is a horizontal post type insulator which is mounted on a power pole 41 and extends horizontally outwardly for attaching conductor 10 therein by clamp 4. When barrier 1 is placed in a vertical orientation as shown in FIG. 2, locking plates 6 and 7 will extend downwardly and pivot to a closed position due to the weight thereof. The lower ends of locking plates 6 and 7 extend downwardly below bottom edge 15 of base plate 5 which will provide a weighted bottom effect to the barrier so that a greater weight will be located below apex 21 of slot 18 to assist in maintaining the barrier in an upright vertical position when installed on an insulator as shown in FIG. 4. This weighted bottom reduces the possibilities of the barrier pivoting on the insulator to an inverted position which would occur if the barrier was top heavy.

When placing barrier 1 on insulator 2, camming edges 30 form a V-shaped guide slot as shown in FIG. 2 which guides the barrier between two of the outermost skirts of insulator 2. The weight of the barrier upon it being lowered on the insulator by an insulative rod 12 engaged with eye hook 11, will cause camming edges 30 to slide along the insulator pivoting locking plates 6 and 7 in an outward direction as shown by arrows A in FIG. 3 enabling the insulator to move into V-shaped slot 18 of base plate 5. The insulator will slide along inner edges 28 of locking plates 6 and 7 continuing to pivot the plates in the outward direction until the insulator enters notches 39 as shown in FIG. 5.

Upon the insulator passing lower corners 43 of notch 39, which is formed at the junction with side edges 28, the insulator will contact projections 40, as shown in FIG. 6. The continued downward movement of barrier 1 will cause plates 6 and 7 to pivot inwardly in a direction opposite that to arrows A of FIG. 3. Plates 6 and 7 pivot from the full line position of FIG. 6 to the dot-dash position thereof as the insulator contacts straight edges 51 and then the curved surfaces of notch 39. This causes the locking plates to swing inwardly to the closed position of FIG. 4 trapping and clamping the insulator in the circular-shaped area formed by curved notches 39 which align with the semi-circular configuration of curved apex 21 of base plate 5.

The weight of the barrier is supported on curved top edge 22 of slot apex 21 of plate 5 and is retained thereon by the clamping and locking action of plates 6 and 7 as shown in FIG. 4. Plates 6 and 7 are prevented from moving away from their juxtaposition with base plate 5 due to the location of leg portions 36 and 37 within envelope openings 32. The engagement of notch projections 40 and curved surfaces 38 with insulator 2 provides the positive locking action of the locking plates about the insulator. The weighted bottom of barrier 1 will maintain it in its upright vertical position on insulator 2 as shown in FIG. 4.

If desired, a locking device 45 (FIGS. 7 and 8) may be engaged in aligned holes 49 formed in a lower portion of plates 6 and 7 to lock the plates in their closed position. Locking device 45 may consist of a shaft 46 and a detent 47, with a hook end 48 for installing and removing it from engagement with locking plates 6 and 7. Locking device 45 prevents the accidental opening of locking plates 6 and 7 and the disengagement of barrier 1 should the barrier rotate for some reason on insulator 2 to an upside down position. Thus, the locking device provides an extra safety feature to barrier 1 and preferably is also formed of a dielectric material.

To remove barrier 1 from insulator 2, locking device 45 is removed from within holes 49, afterwhich insulative rod 12 pulls upwardly on eye hook 11. This upward movement will cause the insulator to slide along the inwardly angled edges 51 (FIG. 6) of notches 39 pivoting the locking plates outwardly in the direction of arrows A (FIG. 3). Edges 28 of the locking plates will slide along the insulator as the barrier is lifted upwardly until it is completely removed from the insulator. The locking plates then will pivot inwardly under their own weight to the closed position of FIG. 2.

FIG. 5 illustrates the placement of barrier 1 on an insulator 52 which extends vertically upwardly from a horizontal cross arm 53 mounted on a pole 41. When using barrier 1 with a vertical post cross arm mounted insulator, the positive opening and closing thereof functions in a similar manner as discussed above with respect to horizontal post pole mounted insulator 2, and therefore need not be described in detail.

Likewise, protection barrier 1 can be used on other types of electric equipment other than insulators 2 and 52 by changing the curvature of apex top edge 22 and the curvature of notches 39 to match the shape of the particular equipment on which the barrier is to be installed without losing the desired positive opening and closing action thereof.

As shown in the figures of the drawings, and in particular FIGS. 1 and 8, offset panels 33 which form envelope openings 32 are located on opposite sides of plates 6 and 7. This enables plates 6 and 7 to be mounted on opposite side surfaces of base plate 5 which will permit the overlapping relationship of projections 40 and curved notches 39 as shown particularly in FIGS. 5 and 6, without interfering with the pivotal movement of the plates during the opening and closing action thereof.

If desired, the particular configuration of plates 5, 6 and 7 can vary without affecting the concept of the invention. However, the rectangular configurations shown in the drawings provide increased insulation spacing or separation of a workman from the pole components, while providing a symmetrical configuration when mounted on an insulator or other type of electrical apparatus. As shown in the drawings, the engagement of side edges 16 and 17 of base plate 5 with the inside surface of end walls 34 of envelope openings 32, limits the inward pivotal movement of locking plates 6 and 7 to the desired closed position in which curved notches 39 align with curved apex 21 in front of plate 5 to form a generally circular opening for receiving the circular shape of the insulator. Likewise, plates 6 and 7 are free to pivot outwardly in the direction of arrows A (FIG. 3) a sufficiently large distance to permit the insulator to pass between notch corners 43 as shown in FIGS. 5 and 6 to enter notches 39 and engage apex 21 of slot 18.

Accordingly, the improved high voltage protection barrier is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the improved high voltage protection barrier is constructed and used, the characteristics of the construction, and the advantageous, new and useful results obtained; the new and useful structures, devices, elements, arrangements, parts, and combinations, are set forth in the appended claims.

What is claimed is:

1. A high voltage protection barrier adapted to be mounted on an insulator of an electric power line including:
   a. an elongated generally flat base plate formed of a dielectric material;
   b. slot means formed in the base plate for slidably receiving an insulator therein for suspending said base plate on the insulator;
   c. a pair of locking plates formed of a dielectric material pivotally mounted on the base plate on opposite sides of the slot means and movable between open and closed positions, each of said locking plates having a generally flat configuration formed with a retaining panel offset from the locking plate to form an envelope opening between said locking plate and panel for receiving a portion of the base plate therein when the locking plates are in the closed position; and
   d. notch means formed in each of the locking plates for trapping an insulator therebetween when the locking plates are pivoted into the closed position about an insulator for locking the barrier on the insulator.

2. The protection barrier defined in claim 1 in which the slot means is a V-shaped slot.

3. The protection barrier defined in claim 2 in which the V-shaped slot is formed by a pair of converging side edges extending inwardly from a bottom edge of the base plate and terminating in a generally semi-circular apex.

4. The protection barrier defined in claim 2 in which the base plate has a generally rectangular configuration having a pair of opposite end edges and a pair of opposite side edges; and in which the V-shaped slot extends inwardly from one of said end edges.

5. The protection barrier defined in claim 1 in which each of the offset panels is formed integrally with its respective locking plate and is located in a corner of said locking plate.

6. The protection barrier defined in claim 1 in which cam means is formed on each of the locking plates for engagement with the insulator for pivotally moving said locking plates from the open position to the closed position upon placing the base plate on the insulator.

7. The protection barrier defined in claim 6 in which the cam means is an edge portion of each of the notch means.

8. The protection barrier defined in claim 1 in which the slot means terminates in an apex; and in which the locking plates are pivotally mounted on the base plate adjacent the apex of the slot means by dielectric pivot pins.

9. The protection barrier defined in claim 1 in which hook means is mounted on the base plate for placing said base plate on an insulator with an insulative tool.

10. The protection barrier defined in claim 9 in which the hook means is an eye hook.

11. The protection barrier defined in claim 1 in which each of the locking plates is formed with an angularly extending corner edge; in which said corner edges define a V-shaped passage therebetween when the locking plates are in the closed position; and in which said corner edges engage an insulator upon the barrier being placed on the insulator causing the locking plates to pivot outwardly toward the open position.

12. The protection barrier defined in claim 1 in which the locking plates extend beyond a bottom edge of the base plate when in the closed position; and in which certain side edges of the locking plates overlap each other when in said closed position.

13. The protection barrier defined in claim 1 in which the notch means align with each other when the locking plates are in the closed position; in which each of the notch means includes an arcuate shaped opening terminating in a camming edge; and in which said camming edges are engaged by an insulator when the barrier is placed thereon to positively move the locking plates to a closed position about the insulator, with said insulator being trapped within the aligned notch means.

14. In combination, a protection barrier mounted on an insulator of an electric power pole including:
  a. a flat base plate formed of a dielectric material having at least a bottom edge and a pair of spaced side edges and formed with a V-shaped opening extending inwardly from the bottom edge and terminating in an apex;
  b. a pair of similar locking plates formed of a dielectric material pivotally mounted on the base plate on opposite sides of the V-shaped opening adjacent the apex thereof and movable between open and closed positions, said locking plates each having retention means for retaining the locking plates closely adjacent to the base plate when in the closed position, and a lower edge formed with a guide surface, said guide surfaces forming a guideway therebetween for engaging the insulator when the barrier is placed on said insulator to pivot the locking plates outwardly toward the open position permitting the insulator to move into the V-shaped opening;
  c. notch means formed in each of the locking plates for receiving the insulator therein when the locking plates are in the closed position; and
  d. cam means formed on the locking plates for moving the locking plates from the open position to the closed position upon the insulator entering the notch means to trap the insulator therein for supporting the barrier on said insulator to protect a workman from contacting a component of the power pole when working on an energized conductor attached to the insulator.

15. The combination defined in claim 14 in which the insulator is a post type insulator mounted on a crossarm attached to the pole; and in which the barrier extends horizontally when mounted on the insulator.

16. The combination defined in claim 14 in which the insulator is a post type insulator attached to the pole and projecting horizontally therefrom; and in which the barrier extends vertically when mounted on the insulator.

17. The combination defined in claim 14 in which the locking plates are pivotally mounted on the base plate by pivot pins; in which the apex of the V-shaped opening has a generally semicircular configuration; and in which an imaginary line extending between the centerline of the pivot pins passes through the imaginary center of said apex.

18. The combination defined in claim 14 in which each of the notch means is formed in an inner edge of the locking plates and includes a curved surface terminating in a corner engageable with the insulator to form the cam means.

19. A high voltage protection barrier adapted to be mounted on an insulator of an electric power line including:
  a. an elongated generally flat base plate formed of a dielectric material;
  b. slot means formed in the base plate for slidably receiving an insulator therein for suspending said base plate on the insulator;
  c. a pair of locking plates formed of a dielectric material pivotally mounted on the base plate on opposite sides of the slot means and movable between open and closed positions;
  d. means formed on each of the locking plates for cooperating with a portion of the base plate to maintain said locking plates closely adjacent the base plate when the locking plates are in the closed position; and
  e. notch means formed in each of the locking plates for trapping an insulator therebetween when the locking plates are pivoted into the closed position about an insulator for locking the barrier on the insulator.

20. The protection barrier defined in claim 19 in which said maintaining means is a panel formed in an offset relationship from each of the locking plates providing an envelope opening between the locking plates and panel for receiving a portion of the base plate therein when the locking plates are in closed position.

* * * * *